Figure 1:
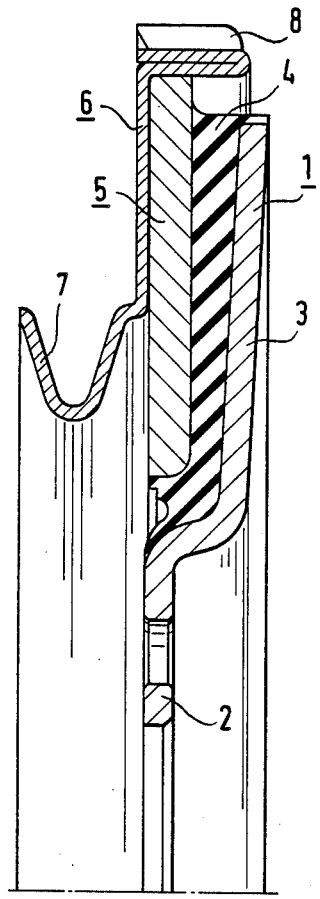

United States Patent [19]
Vohl

[11] Patent Number: 4,882,944
[45] Date of Patent: Nov. 28, 1989

[54] TORSIONAL VIBRATION DAMPER

[75] Inventor: Hans-Jürgen Vohl, Maxsain, Fed. Rep. of Germany

[73] Assignee: Metzeler GmbH, Munich, Fed. Rep. of Germany

[21] Appl. No.: 216,139

[22] Filed: Jul. 7, 1988

[30] Foreign Application Priority Data

Jul. 7, 1987 [DE] Fed. Rep. of Germany ....... 3722352
May 13, 1988 [DE] Fed. Rep. of Germany ....... 3816324

[51] Int. Cl.$^4$ .............................................. F16F 15/10
[52] U.S. Cl. ....................................... 74/574; 474/166
[58] Field of Search ...................... 74/574, 572, 573 R, 74/604, 445, 443, 460; 474/94, 902, 169, 166, 174; 188/380, 378, 268, 379; 464/180

[56] References Cited

U.S. PATENT DOCUMENTS

| | | | |
|---|---|---|---|
| 427,810 | 5/1890 | Thomas | 474/902 X |
| 2,153,914 | 4/1939 | Christman | 74/574 |
| 2,585,382 | 2/1952 | Guernsey | 74/574 |
| 2,724,983 | 11/1955 | O'Connor | 74/574 |
| 2,828,616 | 4/1958 | Zeigler et al. | 74/574 |
| 3,216,267 | 11/1965 | Dolza | 474/94 |
| 4,468,210 | 8/1984 | McCutchan, Jr. | 474/902 |

FOREIGN PATENT DOCUMENTS

| | | | |
|---|---|---|---|
| 1126541 | 6/1982 | Canada | 474/174 |
| 1166552 | 3/1964 | Fed. Rep. of Germany . | |
| 2824331 | 1/1979 | Fed. Rep. of Germany | 74/574 |
| 2744406 | 4/1979 | Fed. Rep. of Germany | 74/574 |
| 3428894 | 2/1986 | Fed. Rep. of Germany . | |
| 3612370 | 10/1987 | Fed. Rep. of Germany | 74/574 |
| 956864 | 9/1982 | U.S.S.R. | 74/574 |
| 828354 | 2/1960 | United Kingdom | 74/574 |

Primary Examiner—Rodney M. Lindsey
Attorney, Agent, or Firm—Herbert L. Lerner; Laurence A. Greenberg

[57] ABSTRACT

A torsional vibration damper includes a hub to be mounted on a crankshaft and a flywheel ring having an outer surface. The hub and the flywheel ring each have the shape of a deformed flat, annular, disk-shaped sheet metal blank. A substantially radially extending rubber track connects the hub to the flywheel ring. A V-belt carrier molded from sheet metal and/or a transducer wheel are secured at least on the outer surface of the flywheel ring.

19 Claims, 1 Drawing Sheet

TORSIONAL VIBRATION DAMPER

The invention relates to a torsional vibration damper, especially for motor vehicle engines, including a hub mounted on a crankshaft, a flywheel ring connected to the hub through a rubber track, and a V-belt carrier and/or a transducer wheel secured to the flywheel ring.

In a torsional vibration damper of this kind, such as that proposed in the German Published, Non-Prosecuted Application DE-OS 36 12 370, the flywheel ring is pressed from a metal sheet, it is integral with the V-belt carrier and optionally with a transducer wheel, and it is folded. The resultant sheet metal ring is placed in a mold and then vulcanized to the actual hub through a suitable layer of rubber. However, the problem of deformation from the release of internal stresses arises, especially because of the pressure and temperature of vulcanization that are reached in the vulcanization process, as well when a rubber layer of this kind is injected. This can warp the sheet metal ring, which often cannot be completely compensated for by balancing it. Furthermore, in a production method of this kind, a separate mold is needed for each type of damper, which entails additional expense.

The same problems arise in a torsional vibration damper as described in German Published, Non-Prosecuted Application DE-OS 34 28 894, in which the large metal masses still permit warping of the individual structural parts during full vulcanization, although the V-belt carrier and transducer wheel are shrunk separately onto the flywheel ring which is coaxial with the hub. Finally, German Published, Prosecuted Application DE-AS 1 166 552 discloses a torsional vibration damper in which a flywheel mass with a relatively complicated structure is vulcanized onto a disk-shaped carrier, and the lateral flange of a V-belt carrier can be clamped into this flywheel mass.

It is accordingly an object of the invention to provide a torsional vibration damper, which overcomes the hereinaforementioned disadvantages of the heretofore-known devices of this general type, which can be produced without the danger of deformation during vulcanization and which has only a slight mass, yet has the same mass moment of inertia as in conventional massive torsional vibration dampers.

With the foregoing and other objects in view there is provided, in accordance with the invention, a torsional vibration damper, especially for motor vehicle engines, comprising a hub to be mounted on a crankshaft, a flywheel ring having an outer surface, the hub and the flywheel ring each having the shape of a subsequently deformed flat, annular, disk-shaped sheet metal blank, a substantially radially extending rubber layer, channel or track connecting the hub to the flywheel ring, and a V-belt carrier molded from sheet metal and/or a transducer wheel both being secured at least on the outer surface or free side of the flywheel ring.

Thus only two geometrically simple parts are joined together by a rubber track in order to make the actual body of the torsional vibration damper, and this joining can be carried out by vulcanization, gluing, calibration or injection, without producing or releasing internal stresses in the metal parts that could lead to a deformation.

In accordance with another feature of the invention, the hub includes a hub flange disposed in a given plane, and the flywheel ring is a flat annular disk disposed in the given plane.

In accordance with a further feature of the invention, the flywheel ring has a rectangular cross section, an inner periphery, and an axial extension on the inside periphery.

In accordance with an added feature of the invention, the V-belt carrier and the transducer wheel are integral or formed as one piece with each other and form a molded sheet-metal part, the flywheel ring has an outer periphery, and the transducer wheel has an inner periphery mounted on the outer periphery of the flywheel ring.

In accordance with an additional feature of the invention, the axial extension of the flywheel ring has an outer periphery, and the V-belt carrier has an inner periphery supported directly on the outer periphery of the axial extension of the flywheel ring.

In accordance with yet another feature of the invention, the V-belt carrier is a carrier for a belt having V-shaped ribs.

In accordance with a concomitant feature of the invention, the hub and the flywheel ring are integrated into a single basic body of a given size combined with V-belt carriers and/or transducer wheels of various dimensions.

Other features which are considered as characteristic for the invention are set forth in the appended claims.

Although the invention is illustrated and described herein as embodied in a torsional vibration damper, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 2:
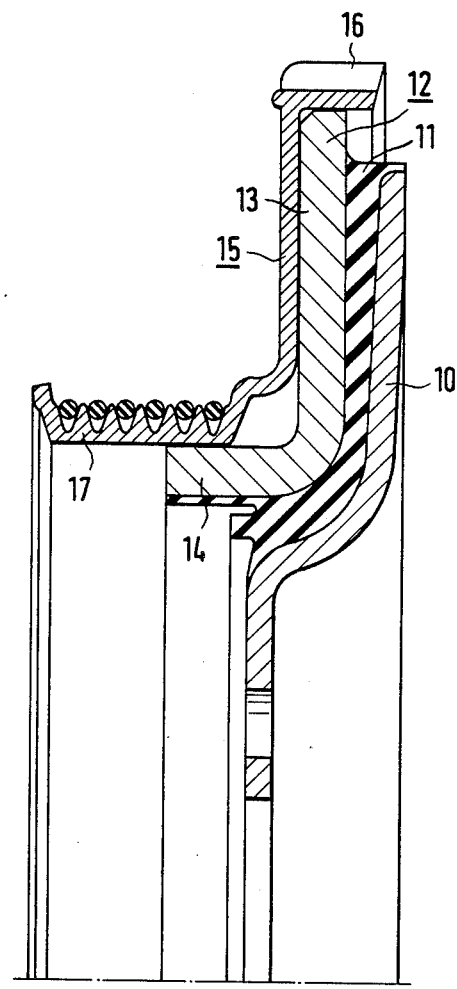

FIG. 1 is a diagrammatic, cross-sectional view through the upper half of a torsional vibration damper having a flat flywheel ring; and FIG. 2 is a cross-sectional view through a torsional vibration damper having a flywheel ring bent at an angle.

Referring now to the figures of the drawings in detail and first, particularly, to FIG. 1 thereof, there is seen a hub 1 of a torsional vibration damper which includes a flange region 2 that is mounted on or flanged to a non-illustrated crankshaft, as well as a hub region 3 that is bent flat radially outwardly in the form of a rim of a plate. A flywheel ring 5 which is disposed on the inside of the hub region 3, is in the form of a flat, smooth annular disk. In the illustrated embodiment, the flywheel ring 5 is located in the plane of the hub flange 2 and is vulcanized through a suitably adjusted layer, channel or track 4 of rubber having the least possible thickness.

Both the hub 1 and the flywheel ring 5 are manufactured from flat sheet metal blanks, and the hub 1 is also subsequently deformed in accordance with the desired shape. The hub 1 and flywheel ring 5 are then placed in a suitable mold, and after complete vulcanization of the natural rubber mixture layer 4 injected between them, they are joined firmly yet elastically with one another. Due to the simple geometric shape of the hub 1 and the flywheel ring 5, deformation caused by the pressure and temperature of vulcanization virtually does not occur. A particular reason for this is that the torsional vibration damper can be placed flat in the vulcanization mold, and it rests flat over a large surface area in the mold. Moreover, despite its slight mass, a basic body of this type for a torsional vibration damper has the same mass moment of inertia as a torsional vibration damper with a more massive construction having an integrated V-belt carrier.

The same advantages are also obtained with other geometrical embodiments, as well as in a version having an injected, glued or calibrated rubber layer.

A sheet metal ring 6, which may integrally include a V-belt carrier 7 and a transducer wheel 8 as a molded sheet metal part, is then secured to the free lateral surface or flank of the flywheel ring 5. In the illustrated embodiment, the molded sheet metal part 6 is mounted in such a way that the inner peripheral surface or radius of the transducer wheel 8 is directly on the outer peripheral surface or radius of the flywheel ring 5. It can be joined to the flywheel ring 5 by gluing or welding, or with mechanical connecting elements in the form of rivets or screws.

Another possible structure is the embodiment illustrated in FIG. 2. In FIG. 2, a flywheel ring 12, which has a rectangular cross section with a radial, disk-like region 13 and an axial section 14 on the inner periphery of the disk-like region 13, is vulcanized by a rubber layer 11 onto a hub 10 having approximately the same configuration as the hub region 3 in FIG. 1. A sheet metal molded part 15 is once again formed of a transducer wheel 16 and a carrier 17 for a belt having V-shaped ribs. The carrier 17 is supported in such a way that the inner periphery thereof is directly on the outer periphery of the axial section or extension 14 of the flywheel ring 12.

Such torsional vibration dampers according to the invention have the advantage of simple manufacture, without the danger of warping of the metal parts, as well as a high mass moment of inertia despite their low mass. Another substantial advantage is that a large number of different end products can be made from basic bodies of uniform dimensions while only using a single molding tool, by combining the basic bodies with V-belt carriers and/or transducer wheels of different sizes and types. The basic principle described herein is also applicable to modified geometrical embodiments of the hub and flywheel ring, as long as they are only manufactured from simple sheet metal blanks, and the V-belt carriers are secured afterward to the flywheel ring by mechanical means.

I claim:

1. Torsional vibration damper, comprising a hub to be mounted on a crankshaft, a flywheel ring having an outer surface, said hub and said flywheel ring each being a shaped flat, annular, disk-shaped sheet metal blank, a substantially radially extending rubber layer connecting said hub to said flywheel ring, and a V-belt carrier molded from sheet metal as well as a transducer wheel both being secured at least on said outer surface of said flywheel ring.

2. Torsional vibration damper according to claim 1, wherein said said hub includes a hub flange disposed in a given plane, and said flywheel ring is disposed in said given plane.

3. Torsional vibration damper according to claim 1, wherein said flywheel ring has a rectangular cross section, an inner periphery, and an axial extension on said inner periphery.

4. Torsional vibration damper according to claim 1, wherein said V-belt carrier and said transducer wheel are integral with each other and form a molded sheet-metal part, said flywheel ring has an outer periphery at said outer surface, and said transducer wheel has an inner periphery mounted on said outer periphery of said flywheel ring.

5. Torsional vibration damper according to claim 3, wherein said axial extension of said flywheel ring has an outer periphery at said outer surface, and said V-belt carrier has an inner periphery supported directly on said outer periphery of said axial extension of said flywheel ring.

6. Torsional vibration damper according to claim 5, wherein said V-belt carrier is a carrier for a belt having V-shaped ribs.

7. Torsional vibration damper according to claim 1, wherein said hub and said flywheel ring are integrated into a single basic body.

8. Torsional vibration damper, comprising a hub to be mounted on a crankshaft, a flywheel ring having an outer surface, said hub and said flywheel ring each being a shaped flat, annular, disk-shaped sheet metal blank, a substantially radially extending rubber layer connecting said hub to said flywheel ring, and a V-belt carrier molded from sheet metal being secured at least on said outer surface of said flywheel ring.

9. Torsional vibration damper according to claim 8, wherein said said hub includes a hub flange disposed in a given plane, and said flywheel ring is disposed in said given plane.

10. Torsional vibration damper according to claim 8, wherein said flywheel ring has a rectangular cross section, an inner periphery, and an axial extension on said inner periphery.

11. Torsional vibration damper according to claim 10, wherein said axial extension of said flywheel ring has an outer periphery at said outer surface, and said V-belt carrier has an inner periphery supported directly on said outer periphery of said axial extension of said flywheel ring.

12. Torsional vibration damper according to claim 11, wherein said V-belt carrier is a carrier for a belt having V-shaped ribs.

13. Torsional vibration damper according to claim 8, wherein said hub and said flywheel ring are integrated into a single basic body.

14. Torsional vibration damper, comprising a hub to be mounted on a crankshaft, a flywheel ring having an outer surface, said hub and said flywheel ring each having a shaped flat, annular, disk-shaped sheet metal blank, a substantially radially extending rubber layer connecting said hub to said flywheel ring, and a transducer wheel being secured at least on said outer surface of said flywheel ring.

15. Torsional vibration damper according to claim 14, wherein said said hub includes a hub flange disposed in a given plane, and said flywheel ring is disposed in said given plane.

16. Torsional vibration damper according to claim 14, wherein said flywheel ring has a rectangular cross section, an inner periphery, and an axial extension on said inner periphery.

17. Torsional vibration damper according to claim 16, wherein said axial extension of said flywheel ring has an outer periphery at said outer surface, and said V-belt carrier has an inner periphery supported directly on said outer periphery of said axial extension of said flywheel ring.

18. Torsional vibration damper according to claim 17, wherein said V-belt carrier is a carrier for a belt having V-shaped ribs.

19. Torsional vibration damper according to claim 14, wherein said hub and said flywheel ring are integrated into a single basic body.

* * * * *